(12) United States Patent
Kourogi et al.

(10) Patent No.: US 8,058,340 B2
(45) Date of Patent: Nov. 15, 2011

(54) PROPYLENE-BASED RESIN COMPOSITION FOR PIPE MEMBER AND PIPE MEMBER FORMED USING THE SAME

(75) Inventors: Hidehiro Kourogi, Nobeoka (JP); Sueyoshi Suetome, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 4 days.

(21) Appl. No.: 11/988,103

(22) PCT Filed: Jun. 30, 2006

(86) PCT No.: PCT/JP2006/313520
§ 371 (c)(1),
(2), (4) Date: Dec. 31, 2007

(87) PCT Pub. No.: WO2007/004706
PCT Pub. Date: Jan. 11, 2007

(65) Prior Publication Data
US 2009/0082513 A1    Mar. 26, 2009

(30) Foreign Application Priority Data

Jul. 1, 2005   (JP) .................................. 2005-193672
Jul. 8, 2005   (JP) .................................. 2005-200715

(51) Int. Cl.
*C08K 3/34*    (2006.01)
(52) U.S. Cl. .......... 524/451; 524/526; 525/89; 525/240; 525/241; 428/36.91; 428/36.9; 428/36.92
(58) Field of Classification Search .................. 524/451; 428/36.9, 36.91, 36.92; 525/89, 240, 241
See application file for complete search history.

(56) References Cited

U.S. PATENT DOCUMENTS

| | | | | |
|---|---|---|---|---|
| 4,458,723 A | * | 7/1984 | Nojiri et al. ................... | 138/149 |
| 5,563,194 A | * | 10/1996 | Watanabe et al. ............. | 524/117 |
| 6,063,504 A | * | 5/2000 | Nagaoka et al. .............. | 428/515 |

(Continued)

FOREIGN PATENT DOCUMENTS

EP    1 004 603 A1 *   8/1998

(Continued)

OTHER PUBLICATIONS

English translation of JP 2000-159949. Imai et. al. Jun. 13, 2000. Obtained from JPO/AIPN translation site.*

(Continued)

*Primary Examiner* — Mark Eashoo
*Assistant Examiner* — Michael Salvitti
(74) *Attorney, Agent, or Firm* — Buchanan Ingersoll & Rooney PC (57) ABSTRACT

A propylene-based resin composition for a pipe member, and a pipe member and multi-layered pipe member formed using that the same, which is comprised of (a) 65 to 90 parts by mass of a propylene resin homopolymer, (b) 10 to 25 parts by mass of talc having an average particle size of 1 to 10 μm and (c) 1 to 10 parts by mass of at least one kind of a rubber component selected from an ethylene-propylene-based rubber, an ethylene-butene-based rubber, a styrene-butadiene-based rubber and a styrene-isoprene-based rubber as main components, wherein the MFR of a melt-kneaded mixture obtained by melt kneading these components (a) to (c) is from 0.01 to 2.00 g/10 minutes.

7 Claims, 2 Drawing Sheets

U.S. PATENT DOCUMENTS

| | | | |
|---|---|---|---|
| 6,087,429 A * | 7/2000 | Yamamoto et al. | 524/451 |
| 6,096,831 A * | 8/2000 | Nagaoka et al. | 525/240 |
| 6,156,836 A * | 12/2000 | Iwanami et al. | 524/451 |
| 6,162,887 A * | 12/2000 | Yamada et al. | 526/351 |
| 6,429,250 B1 * | 8/2002 | Rohrmann | 524/451 |
| 7,718,735 B2 * | 5/2010 | Kanzaki | 525/89 |
| 2003/0100664 A1 * | 5/2003 | Okawa et al. | 524/526 |
| 2004/0014854 A1 * | 1/2004 | Watanabe et al. | 524/210 |
| 2004/0014871 A1 * | 1/2004 | Zanka et al. | 524/505 |
| 2004/0132889 A1 * | 7/2004 | Ohkawa et al. | 524/451 |
| 2006/0160942 A1 * | 7/2006 | Kanzaki | 524/451 |
| 2006/0293424 A1 * | 12/2006 | Tse et al. | 524/270 |
| 2008/0221256 A1 * | 9/2008 | Kanzaki | 524/505 |

FOREIGN PATENT DOCUMENTS

| | | |
|---|---|---|
| EP | 1 197 519 A1 | 4/2002 |
| JP | 63-007932 A | 1/1988 |
| JP | 63-57653 A | 3/1988 |
| JP | 2-41343 A | 2/1990 |
| JP | 4-306261 A | 10/1992 |
| JP | 5-51498 A | 3/1993 |
| JP | 5-98092 A | 4/1993 |
| JP | 6-9836 A | 1/1994 |
| JP | 06-179785 * | 6/1994 |
| JP | 6-179785 A | 6/1994 |
| JP | 07-033919 A | 2/1995 |
| JP | 7-138421 A | 5/1995 |
| JP | 7-314490 A | 12/1995 |
| JP | 10-195264 A | 7/1998 |
| JP | 2000-256519 A | 9/2000 |
| JP | 2001-324079 A | 11/2001 |
| JP | 2002-146151 A | 5/2002 |
| JP | 2002-295741 A | 10/2002 |
| JP | 2004-315715 A | 11/2004 |

OTHER PUBLICATIONS

International Search Report dated Oct. 10, 2006.

Extended Search Report dated Oct. 2, 2009 in corresponding European Application No. 06780845.1.

Official Action dated Aug. 20, 2010, issued in corresponding JP Application No. JP200680023995.7.

Office Action (Notice of Reasons for Rejection) issued by the Japanese Patent Office in corresponding Japanese Patent Application No. 2005-200715, and dated Sep. 13, 2011, with an Enalish translation thereof.

* cited by examiner

EXAMPLE 1          COMPARATIVE 1

PROPYLENE-BASED RESIN COMPOSITION FOR PIPE MEMBER AND PIPE MEMBER FORMED USING THE SAME

TECHNICAL FIELD

The present invention relates to a pipe produced by an extrusion molding method that is preferably used in pipe lines which flow a high-temperature fluid of 60° C. and above, a propylene-based resin composition which is used in pipe members such as joints, flanges, valves and actuator casings produced by an injection molding method, and a pipe member formed using the same. More specifically, this invention relates to a propylene-based resin composition for a pipe member of which the longitudinal elongation of the pipe member associated with thermal expansion particularly during use in pipe lines that flow high-temperature fluid is inhibited due to a low linear expansion coefficient, in addition to a superior long lifespan of the pipe member owing to excellent long-term creep characteristic and minimal ultraviolet degradation, as well as a connection part constructed by means of fusion due to excellent fusion properties, and a pipe member and multi-layered pipe member formed using the same.

BACKGROUND ART

Conventional propylene-based resin compositions possess excellent characteristics such as rigidity, heat and chemical resistance, while propylene-based resin pipe members formed using the same are extensively employed in factories, medical field, and architecture field, etc. In particular, owing to acid-alkali resistance in a high-temperature region as well as low cost, a propylene-based resin pipe is suitable for high-temperature chemical and hot water supply pipe systems in the industrial field, and its widespread use in the future is anticipated.

However, in the case where a propylene-based resin pipe is employed in a pipe line that flows high-temperature fluid, as the typical linear expansion coefficient of the propylene-based resin falls within the range of $12 \times 10^{-5}$ to $15 \times 10^{-5}$/° C., the considerable longitudinal elongation of the pipe associated with thermal expansion poses a problem. Consequently, as a high-temperature fluid of 60° C. and above flows through a fixed pipe, a meandering phenomenon results from the longitudinal elongation of the pipe associated with thermal expansion thereby causing a major distortion stress to arise in the pipe which does not only impair the long-term lifespan of the pipe, fluid leakage caused by distortion that takes place at the connection part to the joint and valve may also occur. As a countermeasure to this problem, a U-shaped passageway (flexible bent pipe) can be set up at regular intervals of the pipe to serve as a buffer to the expansion of the pipe, or by employing a flexible pipe. However, these methods, both present a disadvantage in the cost spent on pipe where a vast amount of space is required for setting up. Thus, reduction of thermal expansion of a propylene-based resin pipe itself is desirable.

Regarding the method to inhibit thermal expansion of a propylene-based resin composition, a method in which a propylene-based resin is mixed with an inorganic filling material has been conventionally employed, wherein a rubber-modified polypropylene resin material is composed of an inorganic filling material comprised of 100 parts of polypropylene and 20 to 50 parts of ethylene-propylene rubber (Japanese Laid-Open Patent Application 63-57653). This resin material is used mainly for bumpers and other automobile parts by virtue of its excellent impact resistance and low linear expansion coefficient.

In order to improve rigidity and heat resistance of conventional propylene-based resin compositions, a polypropylene-based resin composition consisting of 100 parts by weight of polypropylene resin and 30 to 400 parts by weight of surface treated talc is employed as an inorganic filling material that contains the surface treated talc. This polypropylene-based resin composition is surface treated by 0.1 to 5 parts by weight of silicone oil and 0.1 to 5 parts by weight of a higher fatty acid metal salt based on 100 parts by weight of the surface treated talc (Japanese Laid-Open Patent Application 2000-256519). This resin composition is preferably used in various industrial products such as automotive parts by virtue of excellent dispersibility due to the minimal generation of gum.

It could be reasoned that it is possible to inhibit the thermal expansion if the conventional propylene-based resin composition were mixed with an inorganic filling material. However, for a propylene-based resin composition added with an inorganic filling material, technology that takes into consideration the essential characteristics to function as a pipe member has not yet been established. Even if conventional technology is employed in the pipe member by simply adding the inorganic filling material, it is not possible to fulfill the characteristics as a pipe member and hence, such technology, without modification, cannot be applied in the pipe member. Also, one of the crucial properties of the pipe member, creep characteristic, has also not been given adequate consideration. Furthermore, as it is not possible to observe creep characteristic via short-term tests such as tests for tensile strength and Izod impact strength, a propylene-based resin composition with poor long-term creep characteristic cannot be applied as a pipe member.

Conventional propylene-based resin pipe members contain a polypropylene pipe comprised of a polypropylene whose melt flow rate is in the range of 0.005 to 5 g/10 minutes measured at 230° C. under a load of 2.16 kg, the maximum peak region of the endothermic curve measured by a differential scanning calorimeter falls in the temperature range from 128 to 172° C., density is from 898 to 917 kg/m³, the content of units consisting of α-olefin having 4 to 20 carbon atoms is in the range from 0 to 6 mol %, the flexural modulus of a press sheet specimen formed at 200° C. is in the range of 800 to 2,600 MPa (Japanese Laid-Open Patent Application 10-195264). The pipe, free from inorganic filling material or any additive that inhibits the linear expansion coefficient, is formed from a specific polypropylene and hence possesses superior mechanical strength.

DISCLOSURE OF THE INVENTION

As mentioned above, conventional propylene-based resin pipe members do not contain any inorganic filling material or any additive that may suppress the linear expansion coefficient. While the linear expansion coefficient of the composition is at least $12 \times 10^{-5}$/° C. by estimation, as high-temperature fluid flows through the pipe installed, a meandering phenomenon may occur as a result of the longitudinal elongation of the pipe associated with thermal expansion thereby causing a major distortion stress to arise in the pipe and impair the lifespan of the pipe.

In addition, by merely adding an inorganic filling material to the abovementioned propylene-based resin composition, draw-down during the pipe formation may not take place adequately, or even if the pipe is successfully formed, the lifespan of the pipe may be shortened due to inadequate heat resistance or problems may arise such as perishability of the pipe member due to insufficient tensile modulus of elasticity.

The present invention has been made to solve the above problems of conventional propylene-based resin pipe members, and an object thereof is to provide a propylene-based resin composition for a pipe member of which the longitudinal elongation of the pipe member associated with thermal expansion particularly during use in pipe lines that flow high-temperature fluid is inhibited due to a low linear expansion coefficient, in addition to a superior long-term lifespan of the pipe member owing to excellent long-term creep characteristic and minimal ultraviolet degradation, as well as a satisfactory connection part constructed by means of fusion due to excellent fusion properties, and a pipe member and a multi-layered pipe member formed using the same.

The present inventors have made intensive studies regarding a propylene-based resin composition for a pipe member and a pipe member formed using the same, which possess the above-mentioned desirable characteristic. As a result, a pipe member formed from a resin composition consisting of a specific propylene resin, talc and rubber component as necessary components was devised, thereby completing the present invention.

Namely, the present invention has the following characteristics.

A propylene-based resin composition for a pipe member, comprising (a) 65 to 90 parts by mass of a propylene resin homopolymer, (b) 10 to 25 parts by mass of talc having an average particle size of 1 to 10 μm and (c) 1 to 10 parts by mass of at least one rubber component selected from an ethylene-propylene-based rubber, an ethylene-butene-based rubber, a styrene-butadiene-based rubber and a styrene-isoprene-based rubber as main components, wherein the MFR of a melt-kneaded mixture obtained by melt kneading these components (a) to (c) is from 0.01 to 2.00 g/10 minutes is the first characteristic. The propylene-based resin composition for a pipe member further comprise at least one selected from an ultraviolet absorber and a light stabilizer as the second characteristic. The propylene-based resin composition for a pipe member has a linear expansion coefficient within a range from $5 \times 10^{-5}$ to $8 \times 10^{-5}$/° C. is the third characteristic. The propylene-based resin composition for a pipe member has a molecular weight distribution (Mw/Mn) of the propylene resin homopolymer of from 3 to 12 as the fourth characteristic. The propylene-based resin composition for a pipe member has a time until fracture occurs of 1,000 or more in creep characteristic when a tensile load of 3.5 MPa is applied under an atmosphere of 95° C. as the fifth characteristic. The propylene-based resin composition for a pipe member further comprises at least one selected from a talc surface treating agent and a heavy metal deactivator as the sixth characteristic. A pipe member formed using the propylene-based resin composition for a pipe member as the seventh characteristic. A multi-layered pipe member comprising layers made of the propylene-based composition for a pipe member as the eighth characteristic.

EXPLANATIONS OF LETTERS OR NUMERALS

1: Pipe
2: H-shaped steel
3: Fixing member
4: Fixing jig
5: Mold temperature controller

BEST MODE FOR CARRYING OUT THE INVENTION

The propylene resin homopolymer (a) used in the propylene-based resin composition for a pipe member of the present invention is a propylene resin homopolymer containing ethylene of less than 1 wt %, commonly known as a homotype propylene resin. Regarding the propylene resin, there is a random-type propylene resin as well as a block-type propylene resin; however, a homotype propylene resin has a lower linear expansion coefficient compared to the random-type propylene resin, meanwhile the creep characteristic also surpasses that of the block-type propylene resin, hence the longitudinal elongation of the pipe member associated with thermal expansion is inhibited and is desirable as a pipe member with a long-term lifespan. Furthermore, although the polymerization method and polymerization catalyst of the propylene resin homopolymer are not specifically limited, a molecular weight distribution (Mw/Mn) in the range of 3 to 12 is preferable, and still more preferably in the range of 4 to 8. 3 or more is desirable because the inner surface roughness of the pipe formed by extrusion molding is reduced, whereas 12 or less is desirable because the creep characteristic and impact resistance are enhanced.

The compound ratio of the propylene resin homopolymer (a) is from 65 to 90 parts by mass. 65 or more parts by mass is essential to improve the impact resistance while 90 or less parts by mass is essential for the enhancement of thermal expansion.

Talc (b) employed in the propylene-based resin composition for a pipe member of the present invention has an average particle size of 1 to 10 μm. An average particle size of 1 μm or more is essential so as to prevent deterioration of the moldability of the extrusion molding or injection molding, whereas an average particle size of 10 μm or less is essential for the enhancement of the thermal expansion and impact resistance.

The compound ratio of talc (b) is from 10 to 25 parts by mass. 10 or more parts by mass is essential for the reduction of the linear expansion coefficient which in turn prevents distortion stress in the pipe member by inhibiting the longitudinal elongation of the pipe member associated with thermal expansion elongation of the pipe member (particularly the pipe), while 25 or less parts by mass is essential for the enhancement of chemical resistance and impact resistance thermal expansion, as well as ensures a satisfactory construction of the pipe member without reducing the fusion strength.

The rubber component (c) employed in the propylene-based resin composition for a pipe member of the present invention is at least one selected from an ethylene-propylene-based rubber, an ethylene-butene-based rubber, a styrene-butadiene-based rubber and a styrene-isoprene-based rubber, or a compound formed by a combination thereof. Regarding the styrene-butadiene-based rubber and styrene-isoprene-based rubber, hydrogenated compounds thereof are included, and a hydrogen addition ratio close to 100% is preferable in consideration of enhancement of chemical resistance and weatherability as the propylene-based resin composition is formed into a pipe member. In addition, these types of rubber components are highly compatible with the propylene resin homopolymer, forming micro-disperse droplets in the propylene resin homopolymer matrix thereby exhibiting superior impact absorbing potential, and hence are desirable. Of these materials, the styrene-butadiene-based rubber, in particular, by only a small amount demonstrates high impact absorbing potential compared to the other rubber components. Thus, a small amount required is desirable as it is possible to minimize the deterioration of the creep characteristic of the propylene-based resin composition for a pipe member impaired by mixing of the rubber component. Furthermore, it is still more preferable considering the fact that in the case of a super polymer type having a polystyrene equivalent weight average molecular weight of the styrene-butadiene-based rubber of 200,000 and above, the deterioration of creep characteristic of the propylene-based resin composition for a pipe member can almost be completely diminished.

The compound ratio of rubber component (c) is from 1 to 10 parts by mass. 1 or more parts by mass is essential for the enhancement of impact resistance, while 10 or less parts by mass is essential for the enhancement of the long-term creep characteristic.

Also, it is preferable to mix the propylene-based resin composition for a pipe member of the present invention with an ultraviolet absorber or a light stabilizer as a weather resistant agent, or a combination thereof. There is an inclination of ultraviolet degradation when the propylene resin is mixed with an inorganic filling material such as talc. Therefore, in an outdoor application of the pipe member formed by the propylene-based resin composition for a pipe member of the present invention, ultraviolet degradation is prevented by mixing in a weather resistant agent. Examples of an ultraviolet absorber include benzophenone derivatives, benzotriazole derivatives and benzoate derivatives, while examples of a light stabilizer include hindered amine derivatives. The benzophenone derivatives, in particular, are preferably used as a weather resistant agent due to the absence of an antagonizing effect with an antioxidant, and minimal dissolution from the propylene resin during contact with a high-temperature fluid. In addition, the propylene resin homopolymer (a) is mixed with 0.2 to 1.0 parts by mass of the weather resistant agent.

Furthermore, it is preferable to compound the propylene-based resin composition for a pipe member of the present invention with a talc surface treating agent or a heavy metal deactivator, or mixed as a combination thereof. It is known that the weather resistant agent fails to function adequately as the talc absorbs the weather resistant agent. In consideration of this, the absorption of the weather resistant agent by talc is prevented by compounding a talc surface treating agent or a heavy metal deactivator. As a result ultraviolet degradation is effectively inhibited, thereby improving the weatherability. Examples of the talc surface treating agent include an organic silane compound, a fatty acid ester and a fatty acid diethanol amide, whereas examples of the heavy metal deactivator include hydrazine derivatives, acid amine derivatives and benzotriazole derivatives. The use of a fatty acid ester is particularly preferable considering the significant effects with only a small amount and low cost.

The propylene-based resin composition for a pipe member of the present invention may be mixed with an antioxidant, a lubricant, a nuclear agent, a pigment, etc. according to necessity.

After compounding as described above, the melt kneading method is not specifically limited; the propylene-based resin composition for a pipe member of which each and every component is evenly dispersed can be obtained using a single-shaft extruder, double-shaft extruder or kneader.

The propylene-based resin composition for a pipe member thus produced requires a melt flow rate (hereinafter abbreviated to as MFR) of 0.01 to 2.00 g/10 minutes, and more preferably from 0.10 to 0.60 g/10 minutes. An MFR of 0.01 g/10 minutes or more is desirable in order to obtain satisfactory productivity of the propylene-based resin composition for a pipe member, whereas an MFR of 2.00 g/10 minutes or less is desirable to obtain a satisfactory stress cracking property by suppressing the draw-down during the formation of a pipe. In addition, the MFR was measured in compliance with JIS K7210 at a test temperature of 230° C. and under a test load of 2.16 kg.

With regard to the creep characteristic of the propylene-based resin composition for a pipe member thus produced, the time until fracture occurs is preferably 1,000 or more when a tensile load of 3.5 MPa is applied under an atmosphere of 95° C. Thus, long-term use of the propylene-based resin pipe member such as a valve and pipe with a continuous flow of a high-temperature fluid under the state of an internal pressure is possible, and hence is desirable. In addition, the time until fracture occurs of 1,000 or more when a tensile load of 3.5 MPa is applied under an atmosphere of 95° C. is a test condition for the test piece. In the case, a test is performed to the pipe member, particularly the pipe, the test can be conducted by applying an internal pipe pressure of that equivalent to applying a tensile load of 3.5 MPa. The internal pipe pressure can be derived from the outer diameter and pipe wall thickness of the pipe and 3.5 MPa of tensile load using the Naday equation as shown in equation (1).

Internal pipe pressure=(2×pipe wall thickness×tensile load)/(outer diameter of pipe−pipe wall thickness)  (1)

For example, an internal pipe pressure for a pipe having a thickness of 3.0 mm and an outer diameter of 32 mm is calculated as 0.7 MPa.

The linear expansion coefficient of the propylene-based resin composition for a pipe member of the present invention is preferably $5 \times 10^{-5}$ to $8 \times 10^{-5}$/° C. This is preferable in terms of the prevention of the impairment of lifespan of the pipe member due to a meandering phenomenon resulting from the longitudinal elongation of the pipe member associated with thermal expansion while a high-temperature fluid flows through the pipe member (particularly the pipe) formed from the propylene-based resin composition for a pipe member of the present invention which in turn causes a major distortion stress to occur in the pipe and leads to the deterioration of the pipe; also, in the prevention of fluid leakage resulting from a distortion that occurs where the pipe has been connected to a joint or valve.

Furthermore, it can also be a multi-layered pipe member comprising layers made of the propylene-based resin composition for a pipe member of the present invention. The number of layers and the material for each layer are not specifically limited. However, other than those of the propylene-based resin composition for a pipe member of the present invention, the layers preferably comprise a resin with a linear expansion coefficient of $8 \times 10^{-5}$/° C. or more to function more effectively. For example, in the case of a multi-layered pipe member consisting of a two-layered pipe of which the inner layer (wetted layer is an olefin-based resin having a linear expansion coefficient of $15 \times 10^{-5}$/° C. and the outer layer is comprised of layers made of the propylene-based resin composition for a pipe member of the present invention, it is possible to decrease the linear expansion coefficient of the two-layered pipe by having an outer layer comprised of the propylene-based resin composition for a pipe member of the present invention with a low linear expansion coefficient, at the same time achieving chemical resistance owing to the olefin-based resin on the inner layer, and hence is desirable. Besides chemical resistance, in the case where the resin of the inner layer has excellent dissolution potential, the pipe can also be preferably used in an application that disfavors the dissolution of metal ions, particularly in the piping of semiconductor manufacturing plants. In addition, the layer of the propylene-based resin composition for a pipe member can be incorporated into either the inner layer, outer layer or middle layer, or incorporated in multiple layers. Also, the material for layers other than those made of the propylene-based resin composition for a pipe member of the present invention is not specifically limited; however, is preferably an olefin-based resin such as a polypropylene, a polyethylene or a polybutene, an ABS resin, a polyamide resin or a fluororesin such as polyvinylidene fluororide.

The pipe member formed using the propylene-based resin composition for a pipe member of the present invention is not specifically limited, and examples include pipes and multi-layered pipes produced by extrusion molding; joints, flanges, valves, and actuator casings produced by injection molding; and joints, flanges, valves, and actuator casings produced by multi-layered molding.

BEST MODE FOR CARRYING OUT THE INVENTION

The present invention will now be described in more detail by way of examples, but the present invention is not limited thereto.

A pipe was formed using the propylene-based resin composition for a pipe member of the present invention and the performance was evaluated via the following testing methods. The performance of the two-layered pipe of which the outer layer was comprised of layers made of the propylene-based resin composition of the present invention was evaluated via the following linear expansion coefficient measurement (1) and dissolution testing method (8).

(1) Linear Expansion Coefficient Measurement Test

In compliance with JIS K7197, a linear expansion test specimen with a thickness of 5.0 mm, width of 5.0 mm and length of 10.0 mm was removed from the propylene-based resin pipe, and the linear expansion coefficient measurement test was conducted under an atmosphere of 23 to 100° C.

(2) Tensile Test

In compliance with JIS K7113, a tensile test specimen with a thickness of 3.1 mm, width of 10.0 mm and length of 175.0 mm equivalent to test specimen type 1 was removed from the propylene-based resin pipe, and the tensile test was conducted under an atmosphere of 23±1° C. The tensile strength and tensile modulus of elasticity were measured.

(3) Notched Izod Impact Test

In compliance with JIS K7110, a notched Izod impact test specimen with a thickness of 3.1 mm, width of 12.5 mm, length of 63.0 mm, notch depth of 2.5 mm equivalent to test specimen type 4 was removed from the propylene-based resin pipe, and the Izod impact strength was measured under an atmosphere of 23±1° C.

(4) Creep Test

In compliance with DIN 8087, 0.7 MPa of internal pressure (an internal pipe pressure equivalent to 3.0 mm of pipe thickness, 32 mm of outer diameter and 3.5 MPa of tensile load derived from the Naday equation shown in equation (1)) at 95±1° C. was applied to a 1,000 mm propylene-based resin pipe, and the time until fracture occurs was measured.

Internal pressure of pipe=(2×pipe wall thickness×
tensile load)/(outer diameter of pipe−pipe wall
thickness)   (1)

(5) Fusion Test

Butt-joining of the propylene-based resin pipes of 500 mm was carried out using a butt fusion machine, and the test specimen was made in such a way so that the butt-joint part becomes the center, followed by the tensile test. Regarding the acceptability of the fusion test, the tensile test result was compared to the tensile strength produced during tensile test (2) as the distortion was 2%; the fusion strength was accepted if it was above the tensile strength when distortion was 2% (marked as A in Table 1), and the fusion strength was rejected if it was below the tensile strength when distortion was 2% (marked as B in Table 1). Additionally, the above acceptability criterion was based on the prescribed condition that the permissible distortion rate during PP pipe construction according to DVS 2205 is not more than 2%.

(6) Weatherability Test

Using the tensile test specimen, an accelerated degradation test was carried out under a Xenon arc light source of an outdoor exposure test equipment (weather-o-meter), for an irradiation time of 600 hours (irradiation energy 135,000 kJ/m$^2$, equivalent to 6 months of outdoor exposure). Then, the tensile elongation rate was measured and was calculated as a retention rate against the tensile elongation rate at irradiation time 0 hours (500%). The higher the retention rate is, the better the weatherability would be.

(7) Actual Flow Test Using a High-Temperature Fluid

Figure 1:
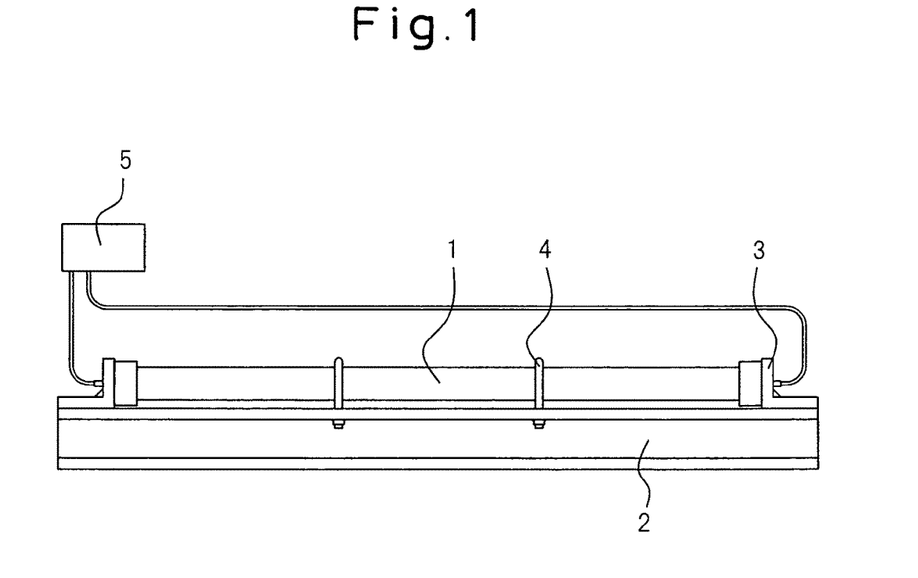
FIG. 1 shows a schematic view of an actual flow test using a high-temperature fluid

Using the test equipment as shown in FIG. 1, propylene-based resin pipe 1 with an outer diameter of 63 mm, thickness of 6 mm and length of 4,000 mm was placed on the H-shaped steel 2 of 4,500 mm, both ends fixed with fixing member 3, and the position at which the length was one third of the pipe from one end of the pipe was fixed with fixing jig 4. After filling the pipe with water, hot water of 90° C. was flowed through the pipe using a mold temperature controller 5 (MCJ, manufactured by Matsui Ltd.). After an hour, the condition of the pipe was visually inspected.

(8) Dissolution Test

One end of a 1,000 mm pipe was fused to a propylene resin cap, followed by an oil-removal treatment. Subsequently, the pipe was filled with ultrapure water and the remaining space filled with nitrogen gas. After sealing the other end with a Saran sheet, it was placed in a water bath at a constant temperature of 80° C. for 24 hours. Then, the pipe was removed and the Mg ion concentration of the ultrapure water filled in the pipe was measured using atomic absorption spectrometry equipment.

The pipe was formed from different combinations of propylene-based resin composition, and the mechanical properties of the pipe were evaluated.

Example 1

75 parts by mass of a homotype propylene resin (Mw/Mn=5, MFR 0.5) as a propylene homopolymer, 20 parts by mass of talc (average particle size of 4.6 μm, P-4, manufactured by Japan Talc Corporation) and 5 parts by mass of a hydrogenated styrene-butadiene-rubber (hereinafter abbreviated to as SBR) (H1062, manufactured by Asahi Kasei Chemicals) were mixed, kneaded by a double-shaft extruder, pelletized, and a propylene-based resin composition with an MFR of 0.5 g/10 minutes was produced. The resin composition thus obtained was made into a propylene-based resin pipe having a thickness of 3.0 mm and an outer diameter of 32 mm at a cylinder temperature of 220° C. using the single-shaft extruder, and the specimens for thr various tests were produced from the pipe. Subsequently, the linear expansion coefficient measurement test, tensile test, notched Izod impact test, creep test and fusion test were performed. The results are shown in Table 1.

Example 2

70 parts by mass of a homotype propylene resin (Mw/Mn=5, MFR 0.5), 20 parts by mass of talc (average particle size of 4.6 μm, P-4, manufactured by Japan Talc Corporation) and 10 parts by mass of an ethylene-propylene-rubber (hereinafter abbreviated to as EPR) were mixed, and a pipe was formed in the same manner as in Example 1 followed by the various evaluation tests. The results are shown in Table 1.

Example 3

75 parts by mass of a homotype propylene resin (Mw/Mn=12, MFR 0.5), 20 parts by mass of talc (average particle size of 4.6 μm, P-4, manufactured by Japan Talc Corporation) and 5 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 1

90 parts by mass of a homotype propylene resin (Mw/Mn=5, MFR 0.5), 5 parts by mass of talc (average particle size of 4.6 μm, P-4, manufactured by Japan Talc Corporation) and 5 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 2

80 parts by mass of a homotype propylene resin (Mw/Mn=5, MFR 0.5) and 20 parts by mass of talc (average particle size of 4.6 μm, P-4, manufactured by Japan Talc Corporation) were mixed, and a pipe was formed in the same manner as in Example 1 followed by the various evaluation tests. The results are shown in Table 1.

Comparative Example 3

65 parts by mass of a homotype propylene resin (Mw/Mn=5, MFR 0.5), 30 parts by mass of talc (average particle size of 4.6 μm, P-4, manufactured by Japan Talc Corporation) and 5 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 4

65 parts by mass of a homotype propylene resin (Mw/Mn=5, MFR 0.5), 20 parts by mass of talc (average particle size of 4.6 μm, P-4, manufactured by Japan Talc Corporation) and 15 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 5

75 parts by mass of a homotype propylene resin (Mw/Mn=5, MFR 0.5), 20 parts by mass of mica having an average particle size of 80 μm and 5 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 6

75 parts by mass of a homotype propylene resin (Mw/Mn=5, MFR 0.5), 20 parts by mass of calcium carbonate having an average particle size of 3 μm and 5 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 7

75 parts by mass of a block-type propylene resin (MFR 0.5, B701WB, manufactured by Mitsui Chemical Corporation), 20 parts by mass of talc (average particle size of 4.6 μm, P-4, manufactured by Japan Talc Corporation) and 5 parts by mass of a hydrogenated SBR (H1062, manufactured by Asahi Kasei Chemicals) were mixed, and a pipe was formed in the same manner as in Example 1 followed by the various evaluation tests. The results are shown in Table 1.

Comparative Example 8

75 parts by mass of a random-type propylene resin (MFR 0.5, B221WA, manufactured by Mitsui Chemical Corporation), 20 parts by mass of talc (average particle size of 4.6 μm, P-4, manufactured by Japan Talc Corporation) and 5 parts by mass of a hydrogenated SBR (H1062, manufactured by Asahi Kasei Chemicals) were mixed, and a pipe was formed in the same manner as in Example 1 followed by various evaluation tests. The results are shown in Table 1.

TABLE 1

Compositions with each formulation, physical properties thereof and evaluation test results of pipes produced using the same

| | | Example 1 | Example 2 | Example 3 | Comparative Example 1 | Comparative Example 2 | Comparative Example 3 |
|---|---|---|---|---|---|---|---|
| Formulation | Homotype propylene resin (1) (Mw/Mn = 5) | 75 | 70 | — | 90 | 80 | 65 |
| | Homotype propylene resin (2) (Mw/Mn = 12) | — | — | 75 | — | — | — |
| | Block type propylene resin | — | — | — | — | — | — |
| | Block type propylene resin | — | — | — | — | — | — |
| | EPR | — | 10 | — | — | — | — |
| | Hydrogenated SBR | 5 | — | 5 | 5 | — | 5 |
| | Talc | 20 | 20 | 20 | 5 | 20 | 30 |

TABLE 1-continued

Compositions with each formulation, physical properties thereof and evaluation test results of pipes produced using the same

|  |  |  |  |  |  |  |  |  |
|---|---|---|---|---|---|---|---|---|
| | Mica | | — | — | — | — | — | — |
| | Calcium carbonate | | — | — | — | — | — | — |
| General physical properties | Linear expansion coefficient | $10^{-5}/°C$ | 6.5 | 6.5 | 6.5 | 10.2 | 6.8 | 6.0 |
| | Tensile strength (Max) | MPa | 34 | 34 | 35 | 33 | 35 | 34 |
| | Tensile strength (2% strain) | MPa | 23 | 23 | 23 | 21 | 27 | 27 |
| | Tensile elasticity | MPa | 2000 | 2000 | 2100 | 1400 | 2300 | 2300 |
| | Izod impact strength | $kJ/m^2$ | 19 | 18 | 15 | 16 | 8 | 15 |
| Physical properties of pipe | Creep characteristic | Time | >1000 | >1000 | 700 | >1000 | >1000 | >1000 |
| | Fusion properties Tensile strength | MPa | 25 | 25 | 25 | 32 | 25 | 22 |
| | Rating | — | A | A | A | A | B | B |

|  |  |  | Comparative Example 4 | Comparative Example 5 | Comparative Example 6 | Comparative Example 7 | Comparative Example 8 |
|---|---|---|---|---|---|---|---|
| Formulation | Homotype propylene resin (1) (Mw/Mn = 5) | | 65 | 75 | 75 | — | — |
| | Homotype propylene resin (2) (Mw/Mn = 12) | | — | — | — | — | — |
| | Block type propylene resin | | — | — | — | 75 | — |
| | Block type propylene resin | | — | — | — | — | 75 |
| | EPR | | — | — | — | — | — |
| | Hydrogenated SBR | | 15 | 5 | 5 | 5 | 5 |
| | Talc | | 20 | — | — | 20 | 20 |
| | Mica | | — | 20 | — | — | — |
| | Calcium carbonate | | — | — | 20 | — | — |
| General physical properties | Linear expansion coefficient | $10^{-5}/°C$ | 6.2 | 6.5 | 9.0 | 6.7 | 8.5 |
| | Tensile strength (Max) | MPa | 31 | 35 | 32 | 30 | 28 |
| | Tensile strength (2% strain) | MPa | 19 | 31 | 20 | 21 | 19 |
| | Tensile elasticity | MPa | 1800 | 3400 | 1900 | 1600 | 1400 |
| | Izod impact strength | $kJ/m^2$ | 27 | 17 | 20 | 35 | 24 |
| Physical properties of pipe | Creep characteristic | Time | 200 | >1000 | 300 | 20 | 600 |
| | Fusion properties Tensile strength | MPa | 21 | 23 | 23 | 23 | 21 |
| | Rating | — | A | B | A | A | A |

As shown in Table 1, Examples 1 to 3 demonstrated that by compounding a homotype propylene resin which is a propylene resin homopolymer with talc and the rubber component, the linear expansion coefficient of the pipe becomes $8×10^{-5}/°C$ or less. Thus, while a high-temperature fluid flows through the pipe having a linear expansion coefficient of $8×10^{-5}/°C$ or less, the meandering phenomenon resulting from the elongation of the pipe associated with thermal expansion is inhibited thereby reducing the distortion stress that occurs to the pipe, hence it is possible to prevent the deterioration of the pipe and fluid leakage due to distortion. In addition, regarding the creep characteristic, 700 hours of Example 3 is slightly short compared to that of Example 1 and Example 2; however, it is possible to use as a pipe member without problem for purposes that do not involve any internal pressure. In the case of Example 1 and Example 2, a long-term use with a continuous flow of a high-temperature fluid under the state of an internal pressure is possible owing to the creep characteristic of 1,000 hours or more. Furthermore, the creep characteristic of Example 1 surpasses that of Example 3 due to the difference in the molecular weight distribution (Mw/Mn). Thus, a molecular weight distribution (Mw/Mn) in the range of 3 to 12 is preferable, and still more preferably in the range of 4 to 8. Also, by virtue of excellent fusion properties, the quality of the connection section constructed by means of fusion is nearly the same as that of the pipe section. From the above, it is understood that the examples exhibited excellent properties as a resin pipe.

Furthermore, the linear expansion coefficient of Comparative Example 1 is nearly 60% greater than that of Example 1 due to the small quantity of talc. Meanwhile, in Comparative Example 3, the fusion properties was impaired by the excessive amount of talc, hence the required fusion strength failed to be achieved. In Comparative Example 2 which lacks the compounding of the rubber component, the Izod impact strength decreased by nearly 40% that of Example 1, and the required fusion strength also failed to be achieved. Meanwhile, in Comparative Example 4, the creep characteristic were impaired by the excessive amount of the rubber component, and as a result, the time until fracture occurs was reduced by about 20% that of Example 1. Therefore, in order to obtain a low linear expansion coefficient, superior long-term creep characteristic and fusion strength, it is vital to employ talc and the rubber component as essential components in the propylene resin homopolymer. Also, the Izod impact strength of Comparative example 2, which lacks the compounding of the rubber component, has improved nearly as much as that of Example 1 and Example 2. However, with regard to the amount of the rubber component, as compared to 10 parts by mass of EPR used in Example 2, only half of that, i.e. 5 parts by mass of hydrogenated SBR was used in Example 1, showing that hydrogenated SBR exhibits superior impact absorbing potential even when used at a quantity less than the other types of rubber components. Owing to the rubber component used only in a small quantity, it is thus possible to minimize the deterioration of creep characteristic of the propylene-based resin composition for a pipe member impaired by compounding of the rubber component. Furthermore, regarding the talc and rubber component, satisfactory results cannot be obtained if used either inadequately or excessively, thus it is crucial to keep the usage of talc within the range of 10 to 25 parts by mass and 1 to 10 parts by mass of the rubber component based on every 65 to 90 parts by mass of the propylene resin homopolymer.

In addition, in Comparative Example 5, instead of compounding talc, the use of mica as an inorganic filler resulted in an excessive tensile modulus of elasticity, consequently a massive distortion stress was generated in the pipe during the flow of a high-temperature fluid and the long-term lifespan of the pipe was impaired. In Comparative Example 6, instead of compounding talc, the use of calcium carbonate as an inorganic filler resulted in an increase of linear expansion coefficient by 40% compared to that of Example 1, thereby impairing the creep characteristic. Thus, talc is required as a main component considering the fact that the use any inorganic filler other than talc may lead to an impaired long-term lifespan.

Also, due to the use of a block-type propylene resin in Comparative Example 7, the creep characteristic were impaired, the time until fracture occurs was reduced to less than 10% (approximately 2%) that of Example 1, and the long-term lifespan of the pipe was impaired. In Comparative Example 8, the linear expansion coefficient increased by 30% compared to that of Example 1 due to the use of a random-type propylene resin. Thus, the propylene resin used in the present invention must be a homotype propylene resin, namely the propylene resin homopolymer, in order to function as a pipe material with excellent creep characteristic as well as to inhibit the longitudinal elongation of the pipe member associated with thermal expansion.

Next, the pipe is formed by compounding a talc surface treating agent and a heavy metal deactivator in Example 1, followed by the evaluation of the weatherability test of the pipe.

Example 4

74.6 parts by mass of a homotype propylene resin (Mw/Mn=5, MFR 0.5), 20 parts by mass of talc (average particle size of 4.6 μm, P-4, manufactured by Japan Talc Corporation), 5 parts by mass of a hydrogenated SBR (H1062, manufactured by Asahi Kasei Chemicals) and 0.4 parts by mass of an ultraviolet absorber (AM-340, manufactured by Nissan Fero Chemical) were mixed, and a pipe was formed in the same manner as in Example 1 followed by the weatherability test. The results are shown in Table 2.

Example 5

74.3 parts by mass of a homotype propylene resin (Mw/Mn=5, MFR 0.5), 20 parts by mass of talc (average particle size of 4.6 μm, P-4, manufactured by Japan Talc Corporation), 5 parts by mass of a hydrogenated SBR (H1062, manufactured by Asahi Kasei Chemicals), 0.4 parts by mass of an ultraviolet absorber (AM-340, manufactured by Nissan Fero Chemical) and 0.3 parts by mass of a heavy metal deactivator (ZS-91, manufactured by Asahi Denka Industry) were mixed, and a pipe was formed in the same manner as in Example 1 followed by the weatherability test. The results are shown in Table 2.

Example 6

74.5 parts by mass of a homotype propylene resin (Mw/Mn=5, MFR 0.5), 20 parts by mass of talc (average particle size of 4.6 μm, P-4, manufactured by Japan Talc Corporation), 5 parts by mass of a hydrogenated SBR (H1062, manufactured by Asahi Kasei Chemicals), 0.4 parts by mass of an ultraviolet absorber (AM-340, manufactured by Nissan Fero Chemical) and 0.1 parts by mass of a talc surface treating agent (MK-600, manufactured by Ajinomoto (registered trademark) Finetechno) were mixed, and a pipe was formed in the same manner as in Example 1 followed by the weatherability test. The results are shown in Table 2.

TABLE 2

Compositions with each formulation, physical properties thereof and weatherability test results of pipes produced using the same

|  |  | Example 1 | Example 4 | Example 5 | Example 6 |
|---|---|---|---|---|---|
| Formulation | Homotype propylene resin (1) (Mw/Mn = 5) | 75 | 74.6 | 74.3 | 74.5 |
|  | Hydrogenated SBR | 5 | 5 | 5 | 5 |
|  | Talc | 20 | 20 | 20 | 20 |
|  | Ultraviolet absorber | — | 0.4 | 0.4 | 0.4 |
|  | Heavy metal deactivator | — | — | 0.3 | — |
|  | Talc surface treating agent | — | — | — | 0.1 |
| Weatherability | Tensile elongation rate and retention rate % | 30 | 60 | 80 | 90 |

According to Table 2, in comparison with Example 1, Examples 4, 5 and 6 demonstrated improved weatherability by compounding an ultraviolet absorber, a heavy metal deactivator and a talc surface treating agent. The combination of an ultraviolet absorber, a heavy metal deactivator and a talc surface treating agent, in particular, further enhances the weatherability. Additionally, a similar result can also be obtained by employing a light stabilizer in place of an ultraviolet absorber. In such a manner, it is possible to improve the weatherability by compounding an ultraviolet absorber and a light stabilizer, while compounding the ultraviolet absorber and light stabilizer with a combination of a heavy metal deactivator and a talc surface treating agent could further enhance the weatherability. With improved weatherability, the ultraviolet degradation can be inhibited even for outdoor application of the pipe member thereby securing the long-term lifespan of the pipe.

Next, the pipe was formed by altering the amount of talc mixed in the propylene resin homopolymer, and the condition of the pipe as a high-temperature fluid flows through was compared to that of Example 1 and Comparative Example 1 by conducting the actual flow test using a high-temperature fluid. The results are shown in Table 2.

Figure 2:
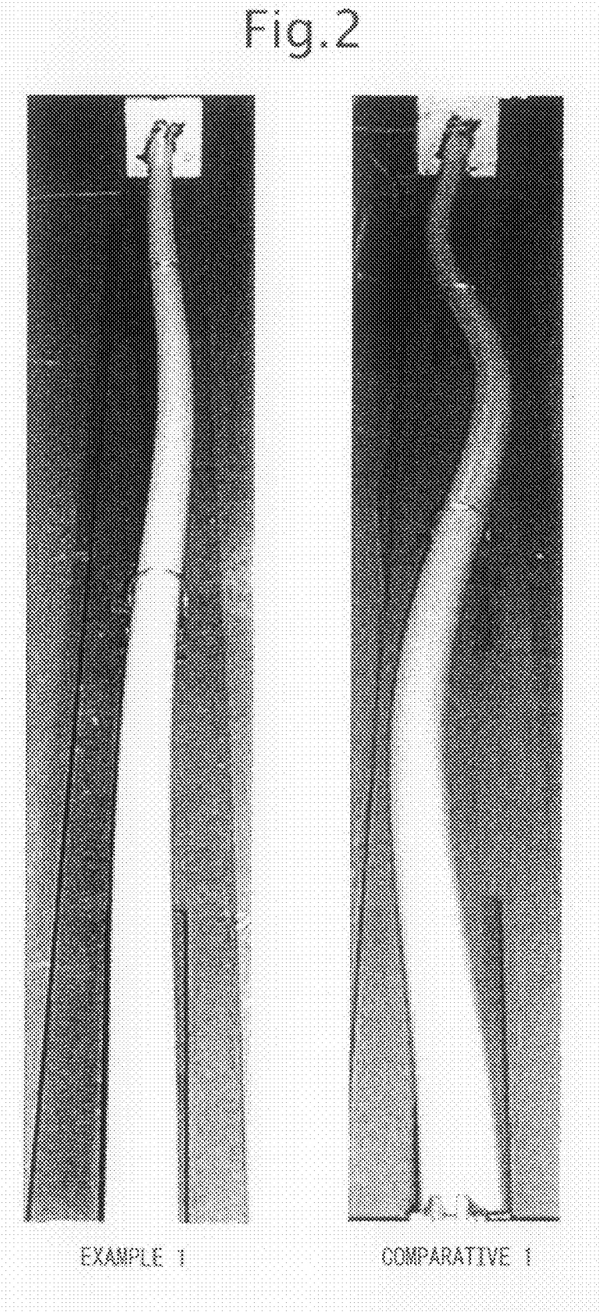
FIG. 2 shows a photograph of the results of the actual flow test using a high-temperature fluid

The linear expansion coefficient in Example 1 is $6.5 \times 10^{-5}/°$ C., whereas the linear expansion coefficient of Comparative Example 1 is $10.2 \times 10^{-5}/°$ C. According to Table 2, in contrast to the severely meandering condition of the pipe in Comparative Example 1, the pipe in Example 1 was merely slightly bent, and the longitudinal elongation of the pipe was inhibited. Also, a massive distortion stress occurred in the pipe member as a result of the severe meandering phenomenon observed in Comparative Example 1. For example, a distortion stress that occurs at the fixing jig installed somewhere on the pipe line may lead to degradation of the pipe, whereas a distortion that occurs where the pipe was connected to the joint or valve may lead to fluid leakage and result in an impairment of the long-term lifespan of the pipe member. Therefore, the linear expansion coefficient for application as a pipe member is preferably in the range of $5\times10^{-5}/°C$ to $8\times10^{-5}/°C$.

Next, evaluation of the dissolution test of the pipe in Example 1 and Example 7 as shown below was performed.

Example 7

A two-layered pipe with an inner thickness of 1.0 mm, a thickness of 3.0 mm and an outer diameter of 32 mm was formed at a cylinder temperature of 220° C. using a single-shaft two-layered extruder in such a way so that the inner layer is a resin composition composed of 100 parts by mass of a homotype propylene resin (Mw/Mn=5, MFR 0.5), whereas the outer layer is comprised of 75 parts by mass of a homotype propylene resin (Mw/Mn=5, MFR 0.5), 20 parts by mass of talc (average particle size of 4.6 μm, P-4, manufactured by Japan Talc Corporation) and 5 parts by mass of a hydrogenated SBR (H1062, manufactured by Asahi Kasei Chemicals). Subsequently, the linear expansion test and the dissolution test were performed. The results are shown in Table 3.

TABLE 3

Compositions with each formulation, and dissolution properties and linear expansion coefficient of pipes produced using the same

| | | | Example 1 (Single-layered structure) (Parts by weight) | Example 7 (Two-layered structure) (Parts by weight) |
|---|---|---|---|---|
| Formulation | Outer layer | Homotype propylene resin (1) (Mw/Mn = 5) | 75 | 75 |
| | | Hydrogenated SBR | 5 | 5 |
| | | Talc | 20 | 20 |
| | Inner layer | Homotype propylene resin (1) (Mw/Mn = 5) | Not formed | formed |
| Dissolution properties (Mg ion concentration) | | μg/L | 9.5 | 1.5 |
| Linear expansion coefficient (α) | | $10^{-5}/°C$ | 6.5 | 6.7 |

According to Table 3, the dissolution of Mg ions in Example 7 as compared to Example 1 was minor because a talc-free propylene resin layer was employed in the inner layer of the pipe which was in contact with chemical reagents. Also, regarding the linear expansion coefficient, although the linear expansion coefficient of the resin composition used in the inner layer of Example 7 was $12\times10^{-5}/°C$, owing to the fact that the outer layer was comprised of propylene resin mixed with talc and the rubber component, the linear expansion coefficient of the pipe remained comparable to that of Example 1. In such a manner, in the case of the pipe in example 7, the low dissolution of the inner layer as well as the low linear expansion coefficient of the outer layer became mutually possible, thus the pipe can be preferably used in applications that disfavor the dissolution of metal ions, particularly in the pipe of semiconductor manufacturing plants.

In addition, although the present examples employed the propylene-based resin pipe produced using extrusion molding, similar results can be obtained using pipe members such as joints, flanges, valves and actuator casings produced by injection molding.

EFFECTS OF THE INVENTION

The pipe member produced using the propylene-based resin composition for a pipe member of the present invention possesses the following excellent characteristics.
(1) By using the propylene-based resin composition for a pipe member of the present invention, it is possible to obtain a pipe member with a reduced linear expansion coefficient, superior long-term creep characteristic and an excellent fusion properties.
(2) As the linear expansion coefficient is in the range of $5\times10^{-5}/°C$ to $8\times10^{-5}/°C$, the meandering phenomenon resulting from the elongation of the pipe member (particularly the pipe) associated with thermal expansion while high-temperature fluid flows through is inhibited, therefore the setting up of a flexible bent pipe or flexible pipe in the pipe is no longer required.
(3) Owing to the low linear expansion coefficient, the distortion stress that occurs to the pipe member as the high-temperature fluid flows through is minimal, hence the deterioration of the pipe and fluid leakage due to distortion are prevented thereby securing the long-term lifespan of the pipe.
(4) The weatherability improved by compounding an ultraviolet absorber and a light stabilizer, whereby ultraviolet degradation can be inhibited even for an outdoor application of the pipe member.
(5) The weatherability is further improved by compounding the ultraviolet absorber and light stabilizer with the combination of a talc surface treating agent and a heavy metal deactivator, whereby the ultraviolet degradation can be inhibited even for outdoor application of the pipe member, thereby securing the long-term lifespan of the pipe.
(6) Regarding the creep characteristic during which a tensile load of 3.5 MPa is applied under an atmosphere of 95° C., the time until fracture occurs is 1,000 hours and above, therefore a long-term use with a continuous flow of a high-temperature fluid under the state of an internal pressure is possible.
(7) By virtue of the layers of the propylene-based resin composition of the present invention, not only is the linear expansion coefficient reduced, but a multi-layered pipe member with chemical resistance and low dissolution can also be obtained owing to the resin composition of the other layers.

LIST OF REFERENCES

1 . . . Pipe
2 . . . H-Shaped steel
3 . . . Fixing member
4 . . . Fixing jig
5 . . . Mold temperature controller

The invention claimed is:
1. A propylene-based resin composition for a pipe member, comprising (a) 65 to 90 parts by mass of a propylene resin homopolymer having a molecular weight distribution (Mw/Mn) of 4 to 8, (b) 10 to 25 parts by mass of talc having an average particle size of 1 to 10 μm and (c) 1 to 10 parts by mass of at least one rubber component selected from the group consisting of an ethylene-propylene-based rubber, an ethylene-butene-based rubber, a styrene-butadiene-based rubber, a styrene-isoprene-based rubber and a combination thereof, wherein a melt flow rate measured by JIS K7210 of a melt-kneaded mixture obtained by melt kneading the components (a) to (c) is from 0.01 to 0.6 g/10 minutes.

2. The propylene-based resin composition for a pipe member according to claim 1, which further comprises an ultraviolet absorber, a light stabilizer or a combination thereof.

3. The propylene-based resin composition for a pipe member according to claim 1 or 2, which has a linear expansion coefficient within a range from $5\times10^{-5}$ to $8\times10^{-5}/°$ C.

4. The propylene-based resin composition for a pipe member according to claim 1 or 2, wherein a time until fracture occurs is 1,000 hours or more in creep characteristic when a tensile load of 3.5 MPa is applied under an atmosphere of 95° C.

5. The propylene-based resin composition for a pipe member according to claim 1 or 2, which further comprises a talc surface treating agent, a heavy metal deactivator or a combination thereof.

6. A pipe member formed from the propylene-based resin composition for a pipe member according to claim 1 or 2.

7. A multi-layered pipe member comprising at least one layer formed using the propylene-based resin composition for a pipe member according to claim 1 or 2 and at least one additional layer.

* * * * *